(12) United States Patent
Burchardt et al.

(10) Patent No.: US 11,441,536 B2
(45) Date of Patent: Sep. 13, 2022

(54) WIND TURBINE BLADE SPAR CAP, WIND TURBINE BLADE AND WIND TURBINE

(71) Applicant: Siemens Gamesa Renewable Energy A/S, Brande (DK)

(72) Inventors: Claus Burchardt, Gistrup (DK); Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/819,654

(22) Filed: Mar. 16, 2020

(65) Prior Publication Data

US 2020/0300214 A1    Sep. 24, 2020

(30) Foreign Application Priority Data

Mar. 21, 2019  (EP) .................................. 19164339

(51) Int. Cl.
*F03D 1/06* (2006.01)
*F03D 80/30* (2016.01)

(52) U.S. Cl.
CPC ......... *F03D 1/0675* (2013.01); *F03D 1/0658* (2013.01); *F03D 1/0691* (2013.01); *F03D 80/30* (2016.05); *F03D 1/0683* (2013.01)

(58) Field of Classification Search
None
See application file for complete search history.

(56) References Cited

U.S. PATENT DOCUMENTS

| 7,651,320 | B2 * | 1/2010 | Hansen | F03D 80/30 416/1 |
| 8,182,227 | B2 * | 5/2012 | Jacobsen | F03D 80/30 416/146 R |
| 8,622,710 | B2 * | 1/2014 | Rindt | F03D 1/0675 416/230 |
| 9,816,482 | B2 * | 11/2017 | Caruso | F03D 1/0633 |

(Continued)

FOREIGN PATENT DOCUMENTS

| EP | 2778393 A2 | 9/2014 |
| EP | 3020958 A1 | 5/2016 |

OTHER PUBLICATIONS

European Search Report and Written Opinion of the European Searching Authority dated Oct. 9, 2019 for Application No. 19164339.4.

*Primary Examiner* — Courtney D Heinle
*Assistant Examiner* — Jason Fountain
(74) *Attorney, Agent, or Firm* — Schmeiser, Olsen & Watts LLP (57) ABSTRACT

Provided is a wind turbine blade spar cap for a wind turbine blade for a wind turbine, the wind turbine blade including a down conductor, the wind turbine blade spar cap including at least one carbon element and at least one conductive layer, wherein the at least one carbon element and the at least one conductive layer are electrically connected, and at least one conductive profile to electrically connect the at least one conductive layer to the down conductor of the wind turbine blade, wherein the conductive profile is electrically connected to the at least one conductive layer and wherein the conductive profile is arranged at the wind turbine blade spar cap. Also provided is a wind turbine blade including a spar cap and a wind turbine including wind turbine blades.

19 Claims, 5 Drawing Sheets

(56) References Cited

U.S. PATENT DOCUMENTS

| | | | |
|---|---|---|---|
| 2006/0280613 A1* | 12/2006 | Hansen | H02G 13/80 416/230 |
| 2009/0196751 A1* | 8/2009 | Jacobsen | F03D 1/0675 416/146 R |
| 2012/0315147 A1* | 12/2012 | Rindt | F03D 1/0675 416/230 |
| 2015/0292479 A1 | 10/2015 | Ohlerich et al. | |
| 2016/0138569 A1* | 5/2016 | Caruso | F03D 80/30 416/241 R |
| 2018/0258916 A1* | 9/2018 | Sawada | F03D 17/00 |

* cited by examiner

WIND TURBINE BLADE SPAR CAP, WIND TURBINE BLADE AND WIND TURBINE

CROSS-REFERENCE TO RELATED APPLICATIONS

This application claims priority to European Application No. 19164339.4, having a filing date of Mar. 21, 2019, the entire contents of which are hereby incorporated by reference.

FIELD OF TECHNOLOGY

The following is related to a wind turbine blade spar cap, a wind turbine blade comprising such spar cap and a wind turbine comprising such wind turbine blades.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade. Long rotor blades experience high wind forces.

Rotor blades may be made of two half-shells connected to each other. Further, a web, in particular a shear web, may be arranged between the two half-shells to reinforce the rotor blade. The shear web may be arranged between two beams or spar caps and may be connected thereto. The shear web, beams, and/or spar caps may extend in a longitudinal direction of the wind turbine blade and may comprise carbon.

The development of wind turbines keeps increasing their height and the span width of their blades and therefore lightning systems to absorb lightning hits and to prevent damage to the wind turbine are included in close to every wind turbine and become increasingly relevant and necessary. A wind turbine may comprise a down conductor establishing grounding exemplarily through the tower and the hub of the wind turbine to which the individual blades are connected. When including carbon elements into a wind turbine blade, those elements especially need to be connected to the down conductor, since carbon is a conductive material and carbon elements tend to burn and/or to split fatally and fail structurally when hit by lightning without the needed electrical grounding. Known solutions to connect a wind turbine blade, especially a wind turbine blade spar cap, to a down conductor have been performed at the blade's shell lamination at the trail edge of the blade. The extra space needed at the blade's tip gives a less efficient blade design, especially at the trail edge of the blade.

SUMMARY

An aspect relates to a wind turbine blade spar cap, a wind turbine blade comprising such spar cap and a wind turbine comprising such wind turbine blades that do not have these drawbacks or at least partially do not have these drawbacks. In particular, to provide a wind turbine blade spar cap for a wind turbine blade that provides an improved blade design for the wind turbine blades and an optimized lightning discharge system of a wind turbine, which is easy to assemble and is of low maintenance.

According to a first aspect of embodiments of the invention, the problem is solved by a wind turbine blade spar cap for a wind turbine blade for a wind turbine, the wind turbine blade comprising a down conductor, the wind turbine blade spar cap comprising at least one carbon element and at least one conductive layer, wherein the at least one carbon element and the at least one conductive layer are electrically connected, and at least one conductive profile to electrically connect the at least one conductive layer to the down conductor of the wind turbine blade, wherein the conductive profile is electrically connected to the at least one conductive layer and wherein the conductive profile is arranged at the wind turbine blade spar cap. The carbon element comprises at least one carbon layer, especially predominantly or only carbon layers. The carbon element especially is formed and arranged to be a carbon beam. The at least one conductive layer is advantageously arranged next to the at least one carbon element. The conductive layer is electrically connected to the carbon element. The conductive layer can be glued to or attached in another way to the at least one carbon element. An advantageous embodiment of the invention includes an amount of carbon elements, especially four or six carbon beams which are intersected with conductive layers. The at least one conductive layer can be arranged horizontally or vertically, especially in between carbon elements. While the carbon element advantageously forms a longitudinal beam, the conductive layer can be formed as a stripe, a cable or a flat surface. A conductive layer designed in that way is more flexible and less likely to be damaged due to the movement and the torsion of the wind turbine blade. A conductive profile is a three-dimensional profile designed to connect the at least one conductive layer with the down conductor of the wind turbine. The conductive profile can be of different dimensions and forms, as will be explained in further paragraphs of the description. An arrangement of the conductive profile at the wind turbine blade spar cap can be understood as the conductive profile being arranged on, at or in the spar cap. In particular the conductive profile is an integral part of the inventive wind turbine blade spar cap. It is not intended by embodiments of the invention to arrange the conductive profile next to the spar cap. The conductive profile can form a side or a part of a side of the spar cap. The conductive profile can also be a separate part attached to the spar cap. The spar cap can comprise further structural means to attach the web to the spar cap and/or the spar cap to the shell lamination of the wind turbine blade. A wind turbine blade spar cap designed in this way is particularly advantageous because it allows for an improved blade design for the wind turbine blade by arranging the connection between the down conductor and the wind turbine blade spar cap spaced apart from the trailing edge of the wind turbine blade. Furthermore, such a wind turbine blade spar cap provides an optimized lightning discharge system of a wind turbine, which is easy to assemble and is of low maintenance.

According to a preferred embodiment of the invention it is advantageous, that at least two carbon elements are arranged next to, especially around, the at least one conductive layer, wherein the at least two carbon elements are especially arranged on opposite sides of the at least one conductive layer. Since the structural needs for a wind turbine blade spar cap are very demanding it is advantageous to have at least two carbon elements, especially two carbon beams. To make best use of the space given, the at least one conductive layer is arranged in between the at least two carbon elements and electrically connected to both of them. A wind turbine blade spar cap designed in this way is particularly advantageous because of its reduced construction space needed and its reliant grounding of the carbon elements through the electrical connection to the conductive layer.

In a preferred embodiment of the invention it is advantageous, that the conductive layer comprises carbon and/or copper, especially an inner and/or an outer layer of carbon and/or copper. The conductive layer can be of different material than or of the same material as the carbon element. Advantageously the conductive layer comprises a high conductivity, as for example given by at least one layer, cable or part of copper inside or as a part of the conductive layer. The conductive layer enables the spar cap, especially the at least one carbon element of the spar cap to be electrically connected with a high conductivity to the conductive profile and thereby to the down conductor. This allows for an improved lightning system for a wind turbine with an improved blade design.

In another preferred embodiment of the invention it is advantageous that the conductive profile comprises at least one attachment means and/or at least one hole for attachment means to attach the at least one conductive layer to the conductive profile. The at least one carbon element can be attached by the same attachment means or by different ones. The carbon element can be attached to the conductive layer and/or the conductive profile. The structural and/or the electrical connection between the conductive layer and/or the carbon element and the conductive profile can be established by at least one attachment means and/or at least one hole for attachment means. This can be achieved by glue, rivets, screws, pins and/or other attachment means. A wind turbine blade spar cap designed in this way is particularly advantageous because of the attachment functionality included in the existing elements. Thereby the construction space for the attachments is advantageously reduced and the electrical connection is securely established. The cost and time for manufacturing a wind turbine blade spar cap designed in this way are reduced.

In another preferred embodiment of the invention it is advantageous that the conductive layer comprises at least one recess, wherein the at least one recess contacts at least one outer side of the conductive profile. In order to arrange the conductive layer and the conductive profile to one another it is advantageous to include means to, for example, limit the depth of intrusion or intersection of the two components. A recess in the conductive layer can be understood as a portion of the conductive layer which is recessed from at least one side in respect to the rest of that at least one side of the conductive layer. A recess can also be created by bending the conductive layer at least once, may be twice, in order to create a surface angled to the main extent of the rest of the conductive layer. When arranging the conductive layer at/on or in the conductive profile the recess contacts at least one outer side of the conductive profile and thereby limits the arrangement advantageously. The conductive profile can comprise a counterpart to the recess in form of a protrusion. The time, costs and material spend for manufacturing and the assembly of the components is getting reduced due to the aforementioned embodiment of the invention and incorrect assemblies are avoided.

In another preferred embodiment of the invention it is advantageous that the conductive layer comprises at least one protrusion wherein the at least one protrusion reaches at least partly into the conductive profile. Similar to the previous paragraph the conductive layer might comprise a protrusion in order to simplify the process of arranging the conductive layer and the conductive profile to one another by, for example, limiting the depth of intrusion or intersection of the two components. A protrusion of the conductive layer can be understood as a portion of the conductive layer which is protruded from at least one side in respect to the rest of that at least one side of the conductive layer. A protrusion can also be created by bending the conductive layer at least once, may be twice, in order to create a surface angled to the main extent of the rest of the conductive layer. When arranging the conductive layer at/on or in the conductive profile the protrusion is inserted or reaches at least partly into the conductive profile and thereby limits the arrangement advantageously. The conductive profile can comprise a counterpart to the protrusion in form of a recess and/or be shaped in a u-form. The time, costs and material spend for manufacturing and the assembly of the components is getting reduced due to the aforementioned embodiment of the invention and incorrect assemblies are avoided. When both aspects, protrusion and recess, are included into the conductive layer, it is advantageous when only one limits the depth of intrusion or intersection of the two components.

In another preferred embodiment of the invention it is advantageous that the conductive profile comprises at least two separate main body parts, wherein the conductive layer is arranged in between the at least to separate main body parts of the conductive profile. The conductive profile can be understood as a clamping device, sandwiching the conductive layer in between the at least two separate main body parts of the conductive profile. A main body part of a conductive profile is to be understood as part of the conductive profile comprising at least 10%, at least 25%, even more at least 33%, most at least 40%, of the volume and/or mass of the conductive profile. The separation between the at least two main body parts of the conductive profile is advantageously horizontally (with respect to the figures). Any or some of the attachment means may penetrate the conductive layer. A wind turbine blade spar car designed in this way is particularly advantageous because it allows a secure connection, structurally and electrically, between the conductive profile and the conductive layer.

According to a preferred embodiment of the invention the conductive profile comprises a connection surface, which is electrically connectable to the down conductor of a wind turbine blade via a connector, especially via a bracket-shaped connector via a connector. The components of the wind turbine blade spar cap and the down conductor can be connected by directly touching each other or by being connected via a connector. A connector can be a bracket or bracket-shaped connector in one of its most simple form. A connector can be made of at least one cable, at least one stripe of conductive material and/or can be provided by a structural component of the wind turbine blade, especially the web. A connecting surface can be flat, curved, a pin or a contact. When the conductive profile is comprising at least two main body parts, both or any one of the parts can comprise the connecting surface. With a connecting surface and for example a bracket shaped connector the down conductor and the conductive profile can be arranged apart from each other and still be easily connected electrically.

According to another preferred embodiment of the invention, the conductive profile, the at least one conductive layer and/or the at least one carbon element and the connector comprise, in particular are fixed to each other with, at least one shared attachment means. Combining the attachment means of at least two components of the wind turbine blade reduces costs and time for assembly. Furthermore, the construction space needed for the attachments means is reduced.

According to a further preferred embodiment of the invention it is advantageous, that the conductive profile is arranged apart from the sides of the wind turbine blade spar cap, especially centered on the wind turbine blade spar cap with respect to at least two sides of the wind turbine blade spar cap. The positioning of the conductive profile determines from where the spar cap is connected to the down conductor. A close distance between those components is advantageous. A centered conductive profile is favorable for example, when the down conductor is positioned at the web and/or when the conductive profile at least partly receives the web as a structural connection as described in a following paragraph. The area in the center of a spar cap receives the least torsion from the movement of the blade and thereby is favorable for the positioning of the conductive profile.

Advantageously, the conductive profile is a conductive wedge comprising a high side and a shallow side, wherein the shallow side of the conductive wedge is directed away from the center of the wind turbine blade spar cap. A conductive wedge of embodiments of the invention is to be understood as a wedge-shaped conductive profile. Two-dimensionally displayed a conductive wedge forms a triangle. The conductive wedge can be manufactured as a single part or comprise at least two main body parts. When comprising at least two main body parts, the most upper parts of the wedge are smaller than the lower parts. The conductive wedge forms at least one end of the carbon element and/or the conductive layer. In an advantageous embodiment two ends, on opposite sides of the carbon element and/or the conductive layer and/or the spar cap are formed by two conductive wedges. A conductive wedge creates a very advantageous transition between the spar cap and the shell lamination since it provides a shape and a transition with minimal stress and a maximum of structural strength. The conductive profile can be of different shapes as well. In particular, the conductive wedge comprises a connection surface which is arranged in the same plane like the inner shell surface of the wind turbine blade.

According to a preferred embodiment of the invention, the conductive profile is a conductive terminal, wherein the conductive terminal comprises a socket for an arrangement of a web of a wind turbine blade. A conductive terminal can be understood as an advanced conductive profile, offering at least one connection surface and at least one additional function, as for example a socket and/or an attachment means for at least partly receiving a web of a wind turbine blade. Further additional functions provided by the conductive terminal can be providing structural strength to the spar cap and/or web and/or beam, further attachment means and/or dampening of vibrations, especially between the spar cap and the web. The conductive terminal is advantageously constructed as a separate part and is to be attached to the spar cap by attachment means. Those attachment means can comprise threaded bushings inserted into a termination plate, which is attached to the at least one carbon element. The conductive terminal can be screwed to the threaded bushing with screws.

According to a second aspect of embodiments of the invention, the problem is solved by a wind turbine blade with a leading edge and a trailing edge. The wind turbine blade comprising at least one web, at least one down conductor and at least one wind turbine blade spar cap according to the first aspect, wherein the at least one conductive profile of each wind turbine blade spar cap is electrically connected to the down conductor. Thus, a wind turbine blade in accordance with embodiments of the invention has the same advantages as described in detail above. A wind turbine blade designed in this way is particularly advantageous because it allows for an improved blade design by arranging the connection between the down conductor and the wind turbine blade spar cap spaced apart from the trailing edge of the wind turbine blade.

According to a preferred embodiment of the invention a shell lamination of the wind turbine blade at least partly encloses the wind turbine blade spar cap, in particular comprises a notch around the connection surface of the wind turbine blade spar cap. Since the wind turbine blade spar cap is usually enclosed by the shell lamination of the wind turbine blade, it is advantageous to leave out the area around the connection surface to connect it to the down conductor more easily. The down conductor usually is arranged at the web of the wind turbine blade and thereby outside the shell lamination and inside the wind turbine blade essentially along a centerline in a longitudinal direction of the wind turbine blade.

According to a third aspect of embodiments of the invention, the problem is solved by a wind turbine comprising at least two wind turbine blades according the second aspect. A wind turbine designed in this way is particularly advantageous because it allows for an improved lightning system and a more efficient blade design by arranging the connection between the down conductor and the wind turbine blade spar cap spaced apart from the trailing edge of the wind turbine blade. Thus, a wind turbine in accordance with embodiments of the invention has the same advantages as described in detail above.

BRIEF DESCRIPTION

Some of the embodiments will be described in detail, with references to the following Figures, wherein like designations denote like members, wherein.

DETAILED DESCRIPTION

Figure 1:
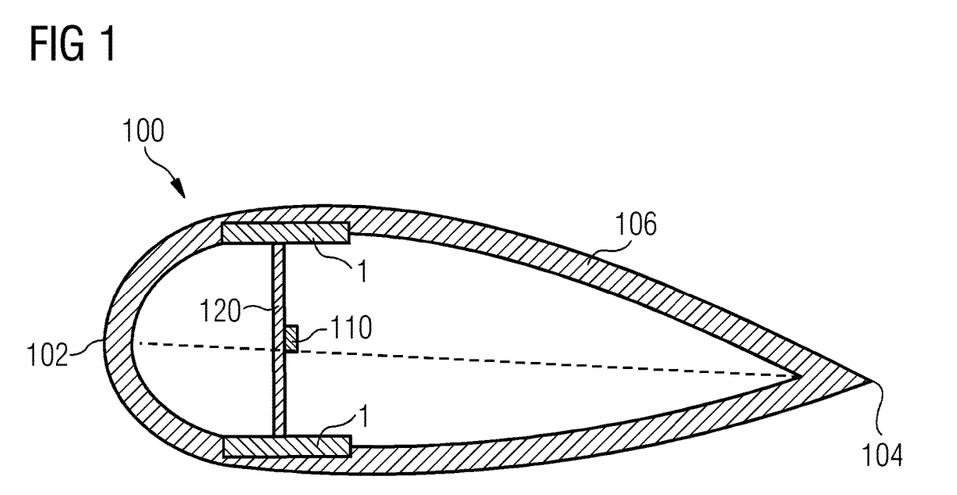
FIG. 1 shows a schematic side view of a wind turbine blade with two wind turbine blade spar caps, a wind turbine blade web and a down conductor.

In FIG. 1 a wind turbine blade 100 with two wind turbine blade spar caps 1, a wind turbine blade web 120 and a down conductor 110 is shown. The wind turbine blade 100 comprises a leading edge 102 and a trailing edge 104. The web 120, the down conductor 110 and the wind turbine blade spar caps 1 extend in a longitudinal direction of the wind turbine blade 100. The wind turbine blade spar caps 1 are arranged at opposite sides of the wind turbine blade web 120. The down conductor 110 usually is arranged at the web 120 of the wind turbine blade 100 and thereby outside the shell lamination 106 and inside the wind turbine blade 100 essentially along a centerline in a longitudinal direction of the wind turbine blade 100.

Figure 2:
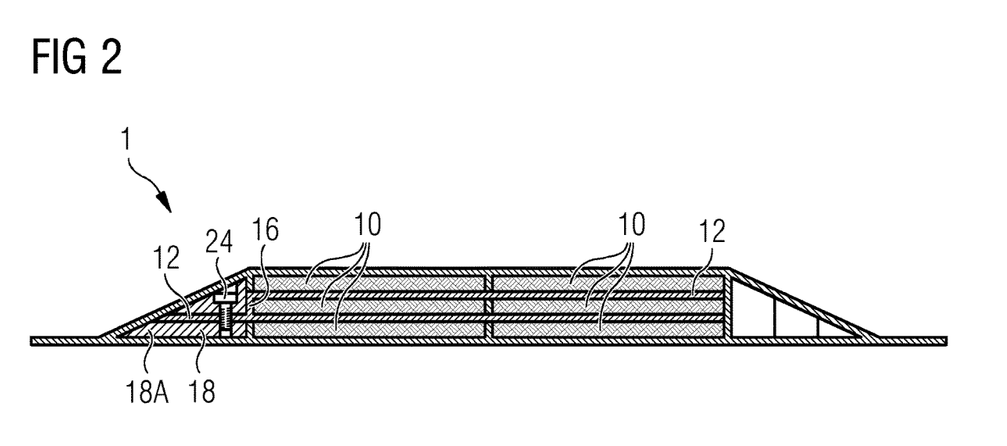
FIG. 2 shows a schematic side view of a wind turbine blade spar cap with six carbon elements, two conductive layers and a conductive profile in form of a conductive wedge with an attachment means.

In FIG. 2 a schematic side view of a wind turbine blade spar cap 1 with six carbon elements 10, two conductive layers 12 and a conductive profile 18 in form of a conductive wedge 18A with an attachment means 24 is shown. The conductive layers 12 are arranged in between the carbon elements 10 and electrically connected to the carbon elements 10 in order to achieve best conductivity from the carbon elements 10 to the conductive profile 18. The conductive wedge 18A is consisting of two main body parts and the conducive layer 12 is placed in between them. The upper conductive layer 10 is bend twice to create a recess 16 and a protrusion 14, which is contacting one outer surface of the conductive profile 18. The attachment means 24 penetrate through the conductive layer 10 and secure both conductive layers 10 and the conductive profile 18 in position. A wind turbine blade spar cap 1 designed in this way is particularly advantageous because it allows for an improved wind turbine blade 100 design for the wind turbine 200 by arranging the connection between the down conductor 110 and the wind turbine blade spar cap 1 spaced apart from the trailing edge 104 of the wind turbine blade 100.

Figure 3:
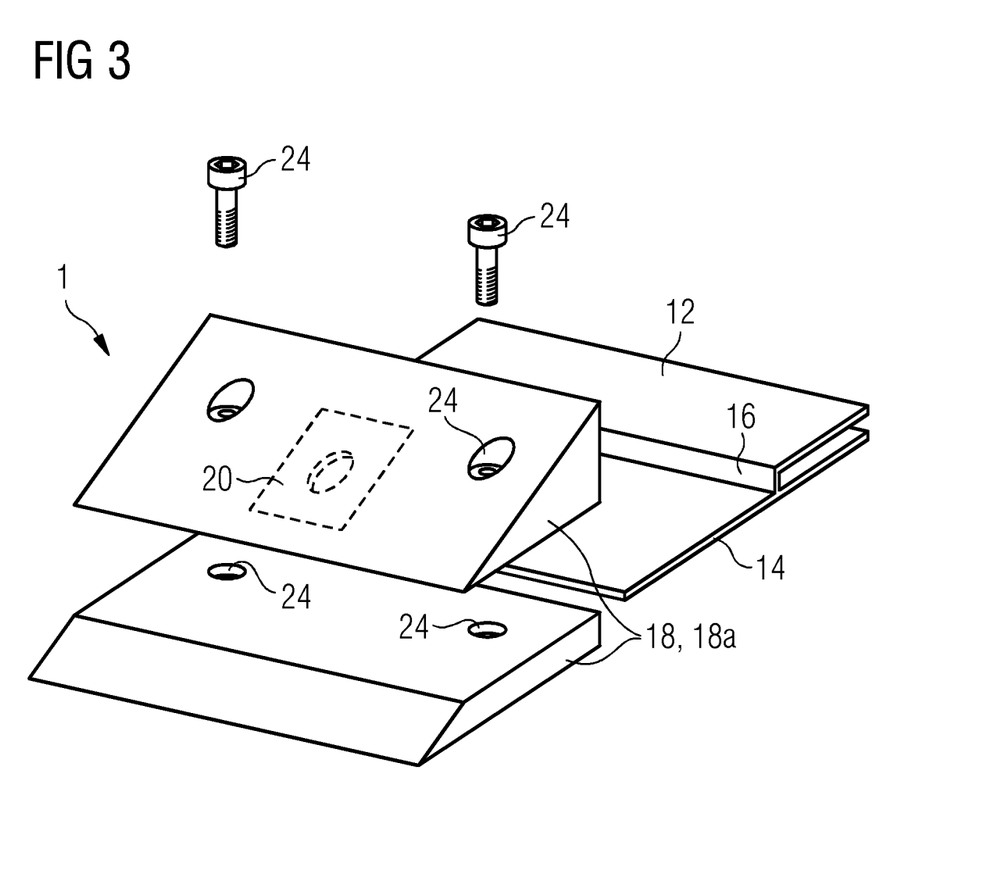
FIG. 3 shows a schematic perspective view of a conductive profile in form of a conductive wedge with two main body parts, a connection surface and attachment means and a conductive layer with a recess and a protrusion.

In FIG. 3 a schematic perspective view of a conductive profile 18 in form of a conductive wedge 18A with two main body parts, a connection surface 20 and attachment means 24 and two conductive layers 12 with a recess 16 and a protrusion 14 are shown. The upper conductive layer 10 is bend twice to create a recess 16, which is contacting one outer surface of the conductive profile 18 and a protrusion 14 which is reaching in between the two main body parts of the conductive wedge 18A. The recess 16, as well as the protrusion 14, as well as the attachment means 24 enable an easy assembly of the wind turbine blade spar cap 1 with a minimum risk of mistakes when arranging the parts with respect to each other. The connection surface 20 comprises an attachment means 24 for a connector 30 (not shown) to electrically connect the conductive wedge 18A to a down conductor 110 (not shown) of a wind turbine blade 100 (not shown).

Figure 4:
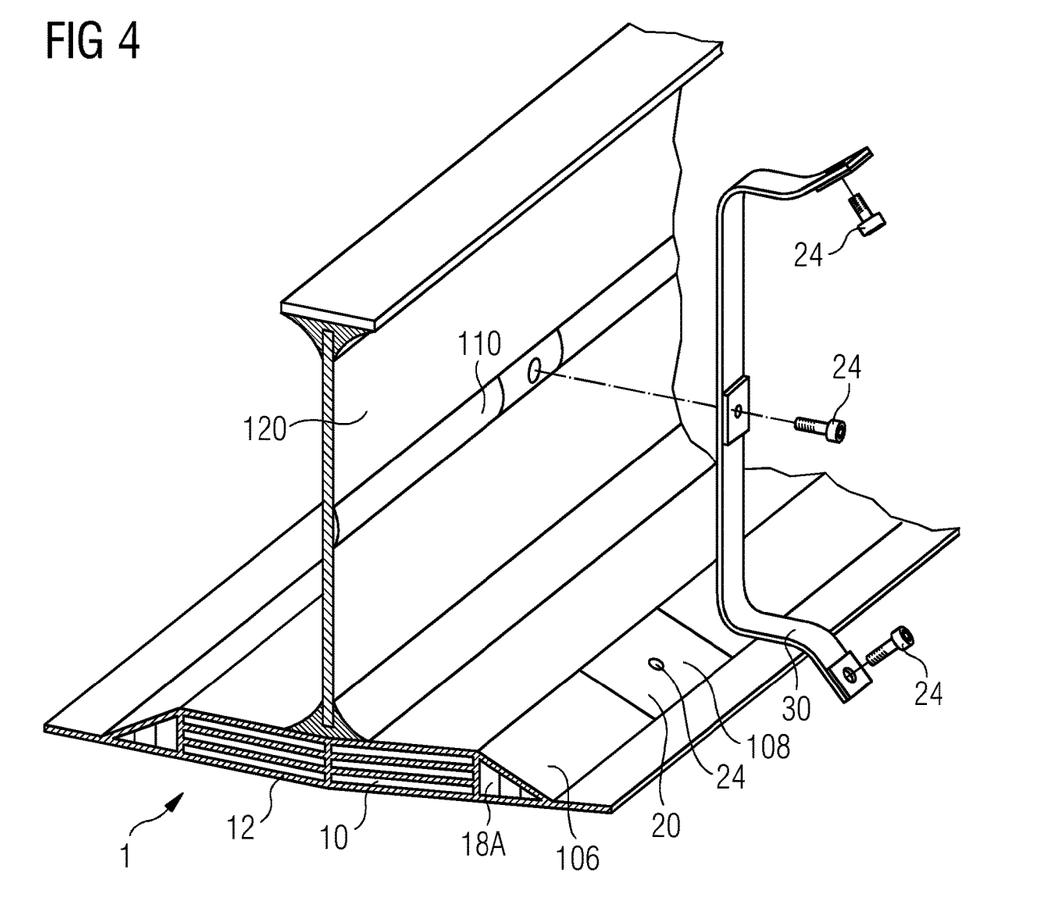
FIG. 4 shows a schematic perspective view of a wind turbine blade spar cap with carbon elements, conductive layers and a conductive profile in form of a conductive wedge with a connection surface and attachment means, a web of a turbine blade, shell lamination with a notch for the connection surface of the spar cap and a connector to connect the connection surface of the conductive profile of the spar cap with the down conductor.

In FIG. 4 a schematic perspective view of a wind turbine blade spar cap 1 with carbon elements 10, conductive layers 12 and a conductive profile 18 in form of a conductive wedge 18A with a connection surface 20 and attachment means 24 are shown. Further a web 120 of a turbine blade 100 (not shown), shell lamination 106 with a notch 108 for the connection surface 20 of the spar cap 1 and a connector 30 to connect the connection surface 20 of the conductive profile 18 of the spar cap 1 with the down conductor 110 of the wind turbine blade 100 (not shown) are shown. The connector 30 is a bracket-shaped connector 30 to connect a lower wind turbine blade spar cap 1 and an upper wind turbine blade spar cap 1 (not shown) to the down conductor 110 of the wind turbine blade 100. The conductive profile 18 in form of a conductive wedge 18A allows for a smooth and stress-free transition in the shell lamination 106 of the wind turbine blade 100, resulting in a more stable wind turbine blade 100.

Figure 5:
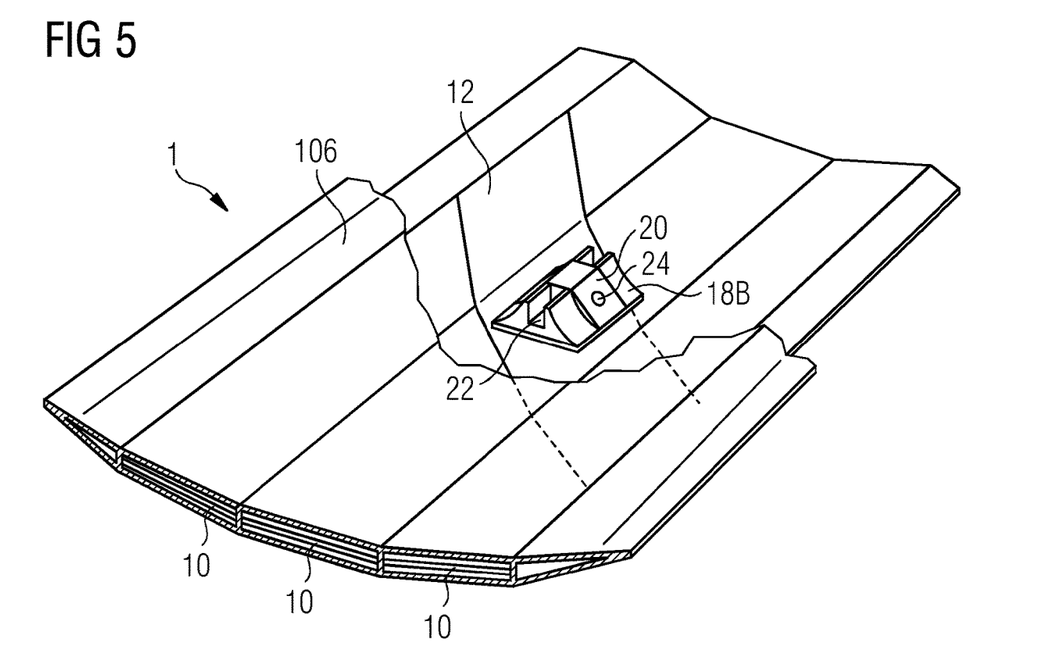
FIG. 5 shows a schematic perspective view of a wind turbine blade spar cap with carbon elements, a conductive layer and a conductive profile in form of a conductive terminal with a connection surface, a socket for the web of a wind turbine blade and attachment means and shell lamination.

In FIG. 5 a schematic perspective view of a wind turbine blade spar cap 1 with carbon elements 10, a conductive layer 12 and a conductive profile 18 in form of a conductive terminal 18B with a connection surface 20, a socket 22 for the web 120 of a wind turbine blade 100 and attachment means 24 and shell lamination 106 are shown. The conductive layer 12 is constructed as a flat stripe across the carbon elements 10. A conductive terminal 18B is placed on top the conductive layer 12 to electrically connect it to the conductive layer 10. The shell lamination 106 is applied afterwards or a space for the connection between the conductive terminal 18B and the conductive layer 12 is left out or subsequently removed. The conductive terminal 18B offers at least one connection surface 20 and at least one socket 22 and/or attachment means 24 for at least partly receiving a web 120 (not shown) of the wind turbine blade 100 (not shown). The conductive terminal 18B is advantageously constructed as a separate part and is to be attached to the spar cap 1 by attachment means 24. The conductive terminal 18B provides a smooth transition to the shell lamination 106 and the further attachment means or the other sockets for the attachment of the web 120 to the spar cap 1. A centered conductive profile 18 is favorable when the down conductor 110 (not shown) is positioned at the web 120 (not shown). The area in the center of a spar cap 1 receives the least torsion from the movement of the wind turbine blade 100 and thereby is favorable for the positioning of the conductive profile 18.

Figure 6:
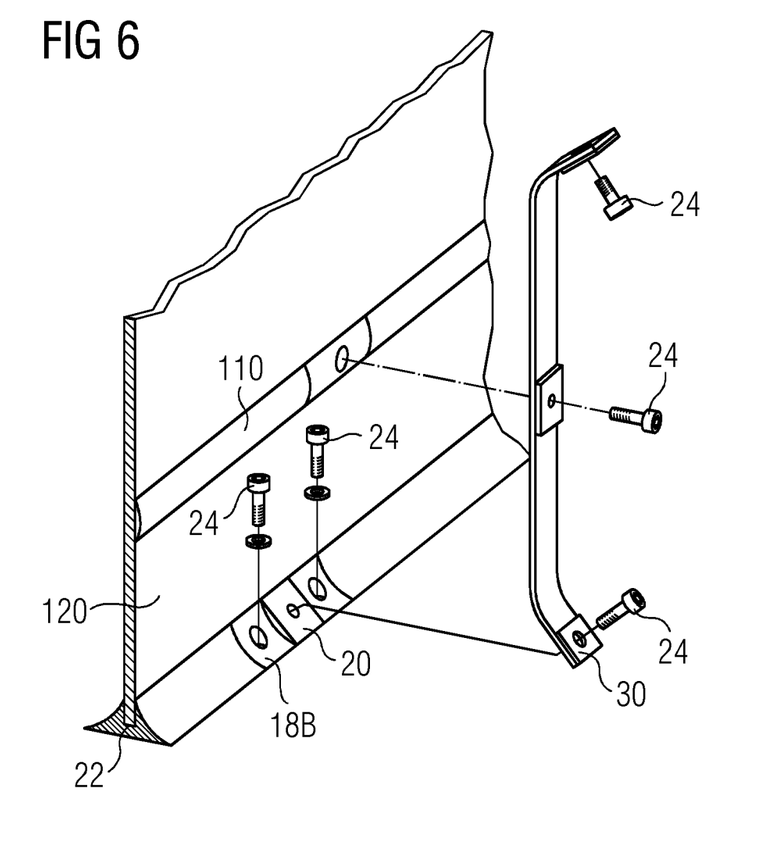
FIG. 6 shows a schematic perspective view of a conductive profile in form of a conductive profile with a connection surface, a socket for the web of a wind turbine blade and attachment means, a web and a down conductor of a turbine blade and a connector to connect the connection surface of the conductive profile of the spar cap with the down conductor of the wind turbine blade.

In FIG. 6 a schematic perspective view of a conductive profile 18 in form of a conductive terminal 18B with a connection surface 20, a socket 22 for the web 120 of a wind turbine blade 100 and attachment means 24, a web 120 and a down conductor 110 of a turbine blade 100 and a connector 30 to connect the connection surface 20 of the conductive profile 18 of the spar cap 1 with the down conductor 110 of the wind turbine blade 100 are shown. Additionally, to the description of FIG. 5 attachment means 24 to attach the conductive terminal 18B to the wind turbine blade spar cap 1 are shown in form of screws and washers. A connector 30 with further attachment means 24 to connect the connection surface 20 to the down conductor 110 is illustrated.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A wind turbine blade spar cap for a wind turbine blade for a wind turbine, the wind turbine blade including a down conductor, the wind turbine blade spar cap comprising:
    at least one carbon element;
    at least one conductive layer, wherein the at least one carbon element and the at least one conductive layer are electrically connected; and
    at least one conductive profile to electrically connect the at least one conductive layer to the down conductor of the wind turbine blade, wherein the at least one conductive profile is electrically connected to the at least one conductive layer;
wherein the at least one conductive profile is arranged at the wind turbine blade spar cap;
wherein the at least one conductive layer comprises at least one recess, the at least one recess contacting at least one outer side of the at least one conductive profile.

2. The wind turbine blade spar cap according to claim 1, wherein at least two carbon elements are arranged next to the at least one conductive layer, further wherein the at least two carbon elements are arranged on opposite sides of the at least one conductive layer.

3. The wind turbine blade spar cap according to claim 1, wherein the at least one conductive layer comprises an inner and/or an outer layer of carbon and/or copper.

4. The wind turbine blade spar cap according to claim 1, wherein the at least one conductive profile comprises at least one attachment means and/or at least one hole for attachment means to attach the at least one conductive layer to the at least one conductive profile.

5. The wind turbine blade spar cap according to claim 1, wherein the at least one conductive layer comprises at least one protrusion, the at least one protrusion reaching at least partly into the at least one conductive profile.

6. The wind turbine blade spar cap according to claim 1, wherein the at least one conductive profile comprises at least two separate main body parts, the conductive layer being arranged in between the at least two separate main body parts of the at least one conductive profile.

7. The wind turbine blade spar cap according to claim 1, wherein the at least one conductive profile comprises a connection surface, which is electrically connected to the down conductor of the wind turbine blade via a connector via a bracket-shaped connector.

8. The wind turbine blade spar cap according to claim 7, wherein the at least one conductive profile, the at least one conductive layer and/or the at least one carbon element and the bracket-shaped connector comprise at least one shared attachment means.

9. The wind turbine blade spar cap according to claim 1, wherein the at least one conductive profile is arranged apart from sides of the wind turbine blade spar cap, centered on the wind turbine blade spar cap with respect to at least two sides of the wind turbine blade spar cap.

10. The wind turbine blade spar cap according to claim 1, wherein the at least one conductive profile is a conductive wedge comprising a high side and a shallow side, further wherein the shallow side of the conductive wedge is directed away from the wind turbine blade spar cap.

11. The wind turbine blade spar cap according to claim 1, wherein the at least one conductive profile is a conductive terminal, the conductive terminal comprising a socket for an arrangement of a web.

12. A wind turbine blade with a leading edge and a trailing edge, the wind turbine blade comprising at least one web, at least one down conductor and at least one wind turbine blade spar cap according to claim 1, wherein the at least one conductive profile of each wind turbine blade spar cap is electrically connected to the down conductor.

13. The wind turbine blade according to claim 12, wherein a shell lamination of the wind turbine blade at least partly encloses the wind turbine blade spar cap, and comprises a notch around a connection surface of the wind turbine blade spar cap.

14. A wind turbine comprising at least two wind turbine blades according to claim 12.

15. A wind turbine blade spar cap for a wind turbine blade for a wind turbine, the wind turbine blade including a down conductor, the wind turbine blade spar cap comprising:
at least one carbon element;
at least one conductive layer, wherein the at least one carbon element and the at least one conductive layer are electrically connected; and
at least one conductive profile to electrically connect the at least one conductive layer to the down conductor of the wind turbine blade, wherein the at least one conductive profile is electrically connected to the at least one conductive layer;
wherein the at least one conductive profile is arranged at the wind turbine blade spar cap;
wherein the at least one conductive profile is a conductive wedge comprising a high side and a shallow side, further wherein the shallow side of the conductive wedge is directed away from the wind turbine blade spar cap.

16. A wind turbine blade with a leading edge and a trailing edge, the wind turbine blade comprising at least one web, at least one down conductor and at least one wind turbine blade spar cap according to claim 15, wherein the at least one conductive profile of each wind turbine blade spar cap is electrically connected to the down conductor.

17. A wind turbine comprising at least two wind turbine blades according to claim 16.

18. A wind turbine blade spar cap for a wind turbine blade for a wind turbine, the wind turbine blade including a down conductor, the wind turbine blade spar cap comprising:
at least one carbon element;
at least one conductive layer, wherein the at least one carbon element and the at least one conductive layer are electrically connected; and
at least one conductive profile to electrically connect the at least one conductive layer to the down conductor of the wind turbine blade, wherein the at least one conductive profile is electrically connected to the at least one conductive layer;
wherein the at least one conductive profile is arranged at the wind turbine blade spar cap;
wherein the at least one conductive profile is a conductive wedge comprising a high side and a shallow side, further wherein the shallow side of the conductive wedge is directed away from the wind turbine blade spar cap;
wherein the at least one conductive profile comprises a connection surface, which is electrically connected to the down conductor of the wind turbine blade via a connector via a bracket-shaped connector.

19. A wind turbine blade with a leading edge and a trailing edge, the wind turbine blade comprising at least one web, at least one down conductor and at least one wind turbine blade spar cap according to claim 18, wherein the at least one conductive profile of each wind turbine blade spar cap is electrically connected to the down conductor.

* * * * *